United States Patent
Shen et al.

(10) Patent No.: US 6,893,708 B2
(45) Date of Patent: May 17, 2005

(54) FUEL CELL FLOWFIELD DESIGN FOR IMPROVED WATER MANAGEMENT

(75) Inventors: John Jianyue Shen, Surrey (CA); Raymond Belanger, Coquitlam (CA); Zuomin Dong, Victoria (CA)

(73) Assignee: Palcan Fuel Cell Co. Ltd., Burnaby (CA)

( * ) Notice: Subject to any disclaimer, the term of this patent is extended or adjusted under 35 U.S.C. 154(b) by 0 days.

(21) Appl. No.: 10/730,599

(22) Filed: Dec. 8, 2003

(65) Prior Publication Data

US 2004/0112740 A1 Jun. 17, 2004

Related U.S. Application Data

(60) Provisional application No. 60/431,733, filed on Dec. 9, 2002.

(51) Int. Cl.$^7$ .............................. B32B 3/20; H01M 2/14
(52) U.S. Cl. ........................... 428/188; 429/34; 429/38; 429/39
(58) Field of Search ................................ 428/166, 172, 428/188; 429/12, 34, 38, 39

(56) References Cited

U.S. PATENT DOCUMENTS

| | | |
|---|---|---|
| 3,554,809 A | 1/1971 | Craft |
| 4,988,583 A | 1/1991 | Watkins et al. |
| 5,108,849 A | 4/1992 | Watkins et al. |
| 5,300,370 A | 4/1994 | Washington et al. |
| 5,686,199 A * | 11/1997 | Cavalca et al. ............... 429/30 |
| 5,776,625 A | 7/1998 | Kaufman et al. |
| 5,981,098 A | 11/1999 | Vitale |
| 6,099,984 A | 8/2000 | Rock |
| 6,387,558 B1 | 5/2002 | Mizuno et al. |

* cited by examiner

*Primary Examiner*—Donald J. Loney
(74) *Attorney, Agent, or Firm*—Robert H. Barrigar

(57) ABSTRACT

A duct interconnecting two channels in a fuel-cell flowfield is disclosed. In use, responsive to a flow velocity differential as between the two channels, reaction product water (in the case of a PEM fuel cell) is drawn from one channel to the other via the duct so as to aid in the removal of reaction product accumulations in one or the other of the channels. Each of the two channels may have an associated flow-velocity-increasing means (such as an in-line venturi) associated with each end of the duct. Depending on the location of the duct within a flowfield, the duct may also help to maintain a desired pressure drop and flow of reactant gas along each channel, which helps propel excess water along the channels, and, when the oxidant is oxygen in air, helps prevent localized oxygen depletion.

14 Claims, 5 Drawing Sheets

FUEL CELL FLOWFIELD DESIGN FOR IMPROVED WATER MANAGEMENT

This application claims the benefit of U.S. Provisional Application No. 60/431,733, filed 9 Dec. 2002 and titled FUEL CELL GAS DELIVERY PLATE FLOWFIELD DESIGN WITH VENTURI FEATURES FOR IMPROVED WATER MANAGEMENT.

FIELD OF THE INVENTION

This invention relates generally to the reactant gas delivery plate flowfield design of electrochemical fuel cells and, more particularly but not exclusively, to Proton Exchange Membrane (PEM) fuel cells.

BACKGROUND OF THE INVENTION

Electrochemical fuel cells convert fuel and an oxidant to electricity and one or more reaction products.

Solid polymer fuel cells of the PEM type generally include a membrane electrode assembly ("MEA") layer comprising a solid polymer electrolyte or ion exchange membrane disposed between two electrode layers (a cathode and an anode). The electrode layers, or gas diffusion layers (GDLs), typically comprise porous, electrically conductive sheet material and an electrocatalyst at each membrane/electrode interface to promote the desired electrochemical reaction.

In PEM fuel cells employing hydrogen and oxygen as the reactant gases (hydrogen as the fuel and oxygen as the oxidant), the reaction product is water. The reactions are as follows:

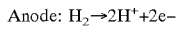
Anode: $H_2 \rightarrow 2H^+ + 2e-$

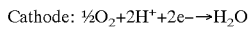
Cathode: $\frac{1}{2}O_2 + 2H^+ + 2e- \rightarrow H_2O$

At the anode, the fuel (hydrogen) moves through the porous electrode material and is oxidized at the anode electrocatalyst to form cations that migrate through the membrane to the cathode. At the cathode, the oxidizing gas or oxidant (typically oxygen contained in air) moves through the porous electrode material and is reduced by reaction with the cations at the cathode electrocatalyst to form the reaction product (water).

For optimal operation, each electrode must be provided with an even and continuous supply of the respective reactant (fuel or oxidant). During operation, the proton exchange membrane in the MEA of a PEM fuel cell must be saturated with water to reach its full electricity production performance and to minimize its electrical resistance. As set out above, reactant-product water is produced at the cathode of the fuel cell. The distribution of water within the MEA is affected by the operation of the fuel cell. Some of the water produced at the cathode tends to diffuse through the proton exchange membrane toward the anode. However, ion drag, the tendency of the ions moving in the proton exchange membrane to drag water molecules with them, tends to cause water in the proton exchange membrane to move toward the cathode. One measure of a fuel cell efficiency is its electrical current output per electrode area, referred to as current density At current densities above approximately 1 amp/cm$^2$, ion-drag-caused movement of water within the proton exchange membrane dominates the movement of water due to normal diffusion, and water tends to collect at the cathode side of the MEA. As current densities increase, the amount of water produced in a given electrode area also increases. Both adequate provision of reactant gases and saturation of the proton exchange membrane require proper water management, viz removal of excess reaction-product water when and where such water is preventing a reactant gas from contacting or readily passing through an electrode; and provision of water when and where the proton exchange membrane is not saturated.

When the oxidant is oxygen in an airflow, ensuring an even and continuous supply of oxidant is complicated by the fact that oxygen makes up only a relatively small portion of the gases in air. As air contacts the cathode, oxygen is consumed by the fuel-cell reaction; therefore, the oxygen concentration in the air tends to decrease the longer the air is in contact with the electrode. As well, the fuel-cell reaction is exothermic. PEM fuel cells operate most effectively at temperatures well above normal ambient temperatures, usually around 85 C, and the fuel cell design must accommodate the dissipation of excess heat.

In conventional fuel cells, the MEA layer is interposed between two substantially fluid-impermeable, electrically-conductive plates, commonly referred to as separator plates. The separator plates serve as current conductors; provide structural support for the electrode layers; and function as key elements for passing waste heat to heat rejecting elements. As well, the separator plates typically provide distribution means for directing the fuel and oxidant to the anode and cathode layers, respectively; and for exhausting reaction products. Typically, these distribution means are channels embossed or machined on each surface of a separator plate that abuts an electrode. In use, the fuel, oxidant and reaction-product water flow through the channels. The channels on a separator plate are collectively referred to as a flowfield. Separator plates having such channels are sometimes referred to as fluid flowfield plates. In use, the channels deliver reactant gases to the electrodes, and the porous electrode materials allow the reactants to diffuse from the channels to the surface of the ion exchange membrane where catalyst materials are located to encourage the reaction. The conductive porous electrode material and the flowfield plates conduct electric current produced at the MEA. Good electrical contact between the flowfield plate and the electrode is important for minimizing electrical resistance within a fuel cell.

Reactant (fuel and oxidant) distribution, electrical contact between the fluid flowfield plates and the electrodes, water management, and oxygen consumption are all affected by the design of the fluid flowfield, including (i) the ratio of channel and land width (the lands separate the channels and abut the adjacent electrode plate, thus establishing electrical contact between the flowfield plate and the electrode plate); (ii) the number and length of channels; (iii) the depth of the channels; and (iv) the general pattern of the flowfield.

Even distribution of reactant gases and even distribution of electrical contact with a fluid flowfield plate are normally achieved by configuring the flowfield to have a relatively large number of small channels and narrow lands rather than a smaller number of larger channels and wider lands. A preferred combination of channel and land width that optimizes the distribution/diffusion of reactant gases and electrical conductivity is often determined through extensive analysis and experiment.

As oxidant air flows along a channel, the concentration of oxygen in the air decreases as the air moves from the upstream to the downstream end of the channel. If the flow in the channel is essentially laminar, the oxygen concentration of the air flowing directly over the surface of the cathode may be less than the oxygen concentration of the rest of the air in the channel. Therefore, it is generally desirable to mix the air as it flows in the channel to avoid a performance-decreasing reduction in the oxygen concentration at the surface of the cathode. It has been found that bends, and rounded corners in the channels tend to induce and promote mixing. However, although mixing of the air in a channel is generally desirable, turbulent flow of the air in a channel is generally not desirable, as turbulent flow may cause eddies or dead spots where water and/or air depleted of oxygen may collect.

Keeping the proton exchange membrane saturated and removing excess water requires a balancing of competing requirements in the flowfield design, and typically requires humidification of the reactant gases (or one of the two) before they enter the fuel cell. For example, unless humidified, ambient reactant air traveling through a channel tends to enter in a relatively dry state, since even humid ambient air will have a relatively low relative humidity once it is heated to the typical fuel-cell operating temperature of about 85 C. As the air moves downstream in a channel, it tends to pick up reaction-product-water vapor, and the relative humidity of the air rises. Therefore, as the air moves downstream, the relative humidity of the air may rise to the point of saturation, at which the air will cease to be a net absorber of water vapor from the MEA. Hence, the tendency of the air to dry the MEA is greatest near a channel inlet and typically decreases to zero as the air moves downstream in the channel. As water is produced all along the length of the channel by the fuel-cell reaction and the air flowing in the channel has a decreasing tendency to absorb water vapor as it moves along the channel, excess water typically tends to accumulate in the downstream portion of a channel. Excess water may accumulate and/or condense inside the reaction flow-channels as well as in the pores of the electrode, a condition known as flooding. Flooding impedes the passage of the reactant gas to and/or through the electrode, reducing fuel cell performance. When water starts to accumulate or condense inside one of the reactant gas channels, the gas flow rate (and velocity) in the channel decreases, and depending on the flowfield pattern and the reactant gas feed means, the flow of reactant gas may be simply diverted to the remaining channels. This diversion reduces the flow in the partially clogged channel and reduces the water-propulsive effect of the reactant gas in the channel, which typically results in a build-up of water within the channel and the GDL pores adjacent to it, until the channel is fully clogged by water. The electrochemical reaction at the affected local active area of the fuel cell will either stop or considerably decrease. The diverted reactant gas flow may also worsen the flow conditions of other flow-channels, and more flow-channels may become clogged one after another. As water continues to accumulate within the flow-channels, the overall performance of the fuel cell may drop significantly due to the gradual reduction of its effective active area.

The known flowfield designs attempt to optimize reactant (fuel and oxidant) distribution; electrical contact between the separator plates and the electrodes; water management; and oxygen consumption. Different general categories of patterns of flowfield channels are known, including: single-channel serpentine flowfields; multiple-parallel-channel flowfields; and multiple-channel serpentine flowfields. Single-channel serpentine flowfields typically comprise a channel with multiple straight parallel legs with 180° switchback turns at each end connecting each leg to the adjacent legs on either side. Such a single-channel serpentine flowfield is disclosed in U.S. Pat. No. 4,988,583 (issued 29 Jan. 1991 to Watkins et al.). Multiple-parallel-channel flowfields typically comprise a set of straight parallel channels that run across the face of the separator plate. Multiple-channel serpentine flowfields typically comprise multiple channels of substantially equal length each having multiple straight legs of different lengths. Such a multiple-channel serpentine flowfield is disclosed in U.S. Pat. No. 5,108,849 (issued 28 Apr. 1992 to Watkins et al.).

Single-channel serpentine flowfields as a class are relatively effective for removing excess water from the channel. In use, the channel in a single-channel serpentine flowfield typically has a relatively large pressure drop along its length because of its small area and long length, and thus water is effectively propelled along the channel. However, the increased pressure required to propel the reactant and excess water through the length of the channel in a single-channel serpentine flowfield tends to have a high parasitic power requirement as compared to other flowfield patterns, and therefore typically results (despite any improved water-removal capability) in lower overall system efficiency. A high flow rate can also induce drying (particularly near the inlet where little reactant water exists). As well, the relatively long length of the channel in a single-channel serpentine flowfield may result in oxygen depletion in the portion of the channel proximate to the downstream end of the channel outlet. Such oxygen depletion may result in an inadequate supply of oxidant to the cathode and thus poor fuel-cell performance.

As compared to single-channel serpentine flowfields, the problem of oxygen depletion is minimized with multiple-parallel-channel flowfields, because of the relatively-shorter channels in the multiple-parallel-channel flowfields. As well, it may be possible to orient multiple-parallel-channel-flowfield fuel cells such that gravity assists in propelling excess water from the channels. However, gravity is typically not completely effective in propelling excess water, and multiple-parallel-channel flowfields generally require a relatively-high flow rate in each channel to purge water. Water causing flooding or clogging in one or a few channels may not be effectively purged since the reactant gas can simply divert through the unflooded channels. Typically, reactant pressure and flow rates in a multiple-parallel-channel flowfield must be significantly higher than with a single channel flowfield, causing a significantly higher parasitic load and dehydration problems in the upstream portions of the channels in a multiple-parallel-channel flowfield. As well, typically, the oxidant air is not effectively utilized since it resides in the channel for only a short time before exiting the fuel cell.

Generally, the best-performing combination of number of channels and bends lies somewhere between single-channel serpentine flowfields and multiple-parallel-channel flowfields, and therefore the multiple-channel serpentine flowfield is the current industry standard. However, although multiple-channel serpentine flowfields typically perform better than single-channel serpentine flowfields and multiple-parallel-channel flowfields, multiple-channel serpentine flowfield fuel cells typically require a relatively high reactant flow rate (with associated high parasitic load) and/or means for balancing flow between channels, to effectively propel excess water from the channels.

U.S. Pat. No. 5,776,625 (issued 7 Jul. 1998 to Kaufman et al.) discloses a multiple-channel serpentine flowfield pattern in which the upstream portion of each channel is adjacent to the downstream portion of another channel (or the same channel in the case of single-channel serpentine flowfields). This so-called counter-current-flow configuration is intended to mitigate the drying effect of the reactant gases in the upstream portions of the channels by locating the upstream portion of a channel adjacent to a region of the MEA having a plentiful supply of water (the downstream portion of an adjacent channel) so that water will diffuse to the region being dried by the reactant gases. Kaufman discloses restrictions at the inlets of the all flow channels within the fuel cell stack intended to ensure uniform air flow among all of the channels. Kaufman does not deal with the removal of excess water.

U.S. Pat. No. 6,387,558 (issued 14 May 2002 to Mizuno et al.) describes the addition of an interconnecting manifold at the mid point of serpentine flow fields to improve performance by balancing flow rates within various channels. Mizuno does not deal with the removal of excess water.

U.S. Pat. No. 6,099,984 (issued 8 Aug. 2000 to Rock) describes the flow that can occur between channels (or legs of the same channel) in a flowfield when one channel is at a higher pressure than the other. When such a pressure differential exists, the reactant gas will tend to flow through the porous electrode, bypassing the land separating the channels (or legs of the same channel). Rock teaches that such cross-flow may be advantageous in that it may permit gas flow between adjacent legs of the same channel even when the flow channel is blocked (e.g. by a water droplet). A disadvantage of such cross flow with some flowfield patterns is that if a channel outlet is adjacent a channel inlet, the higher-pressure at the channel inlet may cause some of the reactant gas to cross flow to the channel outlet, thereby bypassing the desired flow path through the channel. Rock discloses a flowfield pattern intended to overcome this disadvantage. Rock does not deal with the removal of excess water.

What is needed is an improved means for managing water in fuel cells so as to reduce flooding and water clogging of the channels and porous electrodes.

SUMMARY OF THE INVENTION

In one aspect, the present invention is a structural characteristic of a fuel-cell flowfield that provides an automatic self-correcting clog-removal mechanism that facilitates the removal of excess water from the flowfield channels. The novel structure is a duct connecting two channel regions (typically, a leg in each of two neighboring channels) for transferring water between the two channel regions and for slowing the formation of water clogs in the channels.

When water accumulates in a channel region so as to partially or completely block the channel (this phenomenon is referred to hereafter as a blocked channel), the flow velocity of the reactant gas in the blocked channel tends to decrease as compared to the flow velocity in an unblocked or less-blocked channel region (referred to hereafter as an unblocked channel). When a duct connects the blocked and unblocked channel regions, the difference in flow velocity between the vicinity of the duct end opening in the blocked channel region and the vicinity of the duct end opening in the unblocked channel region results in a pressure difference between the vicinities of the two duct openings, with the duct end opening vicinity of relatively-lower flow velocity (i.e. in the blocked channel) having a higher pressure than the duct end opening vicinity of relatively-higher flow velocity (i.e. in the unblocked channel). Typically, the pressure in the duct end opening vicinity of relatively-higher flow velocity is less than the pressure upstream of the blockage. When a duct connects the blocked and unblocked channel regions, the relatively lower pressure of the reactant gas flowing over the duct end opening in the unblocked channel tends to draw water from the blocked channel via the duct. The relatively-higher flow velocity in the unblocked channel tends to propel the water along the unblocked channel, typically out of the fuel cell. Depending on the location of the duct end openings and the general flowfield pattern, a duct may be used to transport water to a channel region where the MEA tends to be too dry.

The desired location and number of ducts in a flowfield for effective water removal depends on a variety of factors. For example, in air-cooled fuel cells, the channel regions near the channel inlets may be cool enough to cause water to condense from the reactant gas, particularly if the reactant gas is humidified, causing undesirable water accumulations in the upstream channel regions. In air-cooled fuel cells, it may be desirable to locate ducts in the vicinity of the channel inlets. However, typically, flooding is most likely to occur in the downstream portions of the channels, and it is generally preferable to locate ducts closer to the channel outlets than the channel inlets, and generally in the downstream third of the channels. Ducts may be used to interconnect channels in a variety of ways, for example: a plurality of ducts may be spaced along two neighbouring channels; and/or ducts may be used to connect a channel region to more than one other channel region. The desired number of ducts and their preferred locations along the channels largely depend on the fuel cell's operational current density (which determines the amount of by-product water); the flow rate, pressure and humidity of the fuel and oxidant; the cross-sectional dimensions of the channels, the number of the channels, and the surface finish of the channel walls. The number and locations of the ducts are best determined through pressure drop calculation, computational fluid dynamics (CFD) simulation (given the dimensions of the channels and the ducts, and fuel cell testing.

A duct or ducts connecting channel regions may effectively reduce local flooding and enhance fuel cell performance. Typically, with multiple channel flowfields, when blockage in one channel inhibits reactant gas flow in that channel, reactant gas tends to be diverted to one or more unblocked channels with a resulting increased flow velocity in the unblocked channel or channels. The increased flow velocity in the other unblocked channels increases the flow-velocity-induced pressure differential as between the vicinity of the duct end opening in the blocked channel and the vicinity of the duct end opening in the unblocked channel, dynamically enhancing the water drawing effect of a duct connecting the two channels responsive to the extent to which flow in the blocked channel is inhibited. In this way, a duct connecting two channel regions in a flowfield may automatically remove accumulated water so as to reduce localized flooding.

Ducts connecting channels in a flowfield may also slow the formation of water clogs in the channels, in that when the flow velocities in duct-connected channel regions are roughly similar, the ducts operate to equalize the reactant gas pressure in the connected channel regions. Depending on the number of ducts and the location of the end openings of the ducts, this pressure equalization may operate to ensure that the channels in a flowfield have adequate pressure at key locations of the flowfield and adequate pressure drop throughout the length of the channels. The duct-produced pressure equalization thereby helps to maintain a desired flow of reactant gas along each channel, which helps propel excess water along the channels, and, when the oxidant is oxygen in air, helps prevent localized oxygen depletion.

Preferably, for ease of manufacture, the ducts are machined or embossed onto the surface of the flowfield plate. Alternatively, if it is desirable to run a duct between only two channel regions that are not adjacent, such as for example to connect a channel region where water tends to accumulate with a channel region that tends to be too dry, or if adjacent channel regions do not experience similar reactant flow velocity and pressure during normal unblocked operation due to differences as between the channels (say due to the geometry of the flowfield), the duct may be routed through the body of a flowfield plate or via a manifold.

To obtain the desired duct water-drawing effect and to avoid undesirable bypass of the reactant gas through shortcut passages, the cross-sectional area of the most constricted portion of the duct is preferably less than the cross-sectional area of each channel in the vicinity of the respective duct end opening. Preferably the cross-sectional area of each duct end opening is less than the cross-sectional area of the respective channel at the duct end opening. Suitable relative cross-sectional areas for the channels, and duct, depend on a variety of factors, including the general pattern of the flowfield, the length of the duct, the operating flow rate etc., and are best determined on a case-by-case basis.

Each duct end opening may be associated with a means for increasing the flow velocity (and thus reducing the pressure) of the reactant gas in the associated channels in the vicinity of the duct end opening. Preferably, each such flow-velocity increasing means is a venturi or tapered narrowing of the channel, with each duct end opening located at or near the narrowest portion or throat of the associated venturi. When the flow velocity in each of two duct-connected channel regions is roughly the same, the venturis at the end openings of the duct increase the flow velocity within each venturi, and thereby reduce the pressure at each duct end opening, by a roughly equal amount, which does not induce any flow between the channel regions via the duct. When the flow velocity of one channel region is reduced by a water blockage in that channel and is less than the other channel region, in the channel region with the higher flow velocity, the venturi-induced increase in flow velocity and resulting pressure drop enhance the drawing of water from the channel region with the lower flow velocity. The venturi-induced enhancement of water transfer via a duct is most significant when the flow velocity approaches zero in the channel region with the lower flow velocity. However, the increase in flow velocity (and thus the decrease in pressure) induced by the venturi is proportional to the flow velocity immediately upstream of the venturi. Therefore, a venturi at each duct end opening tends to amplify the flow-velocity differential (and resulting pressure differential) between two duct-connected channels, and the duct/venturis combination is more sensitive to obstruction-induced flow-velocity decreases than a duct alone. The introduction of venturis into the channels in a flowfield may increase the manufacturing cost of the flowfield plate, and this possible added cost must be weighed against the enhancement in fuel cell performance obtained through the venturis, which will vary depending on the flowfield pattern etc.

The flow of fluid in and out of a duct; the interruption of a channel wall that is a duct end opening; and a venturi, may all act to improve the flow regime of a reactant gas, particularly oxidant air. These structural and operational characteristics all tend to disrupt the laminar flow of the air, and thus induce mixing of the oxidant air stream, which helps prevent a depletion of oxygen at the air-to-MEA interface.

Comparative experiments conducted by the inventors have indicated that the introduction of a duct (or more typically, ducts) between channels in a flowfield improves fuel cell electrochemical reaction and power generation performance.

Use of the duct or duct/venturis combination in a flowfield is not limited to PEM fuel cells, and reactants of the fuel cell are not limited to gas form. Clogging of a flow channel by any clogging substances can be impeded and/or removed by a duct or duct/venturis combination.

DETAILED DESCRIPTION OF PREFERRED EMBODIMENT

Figure 1:
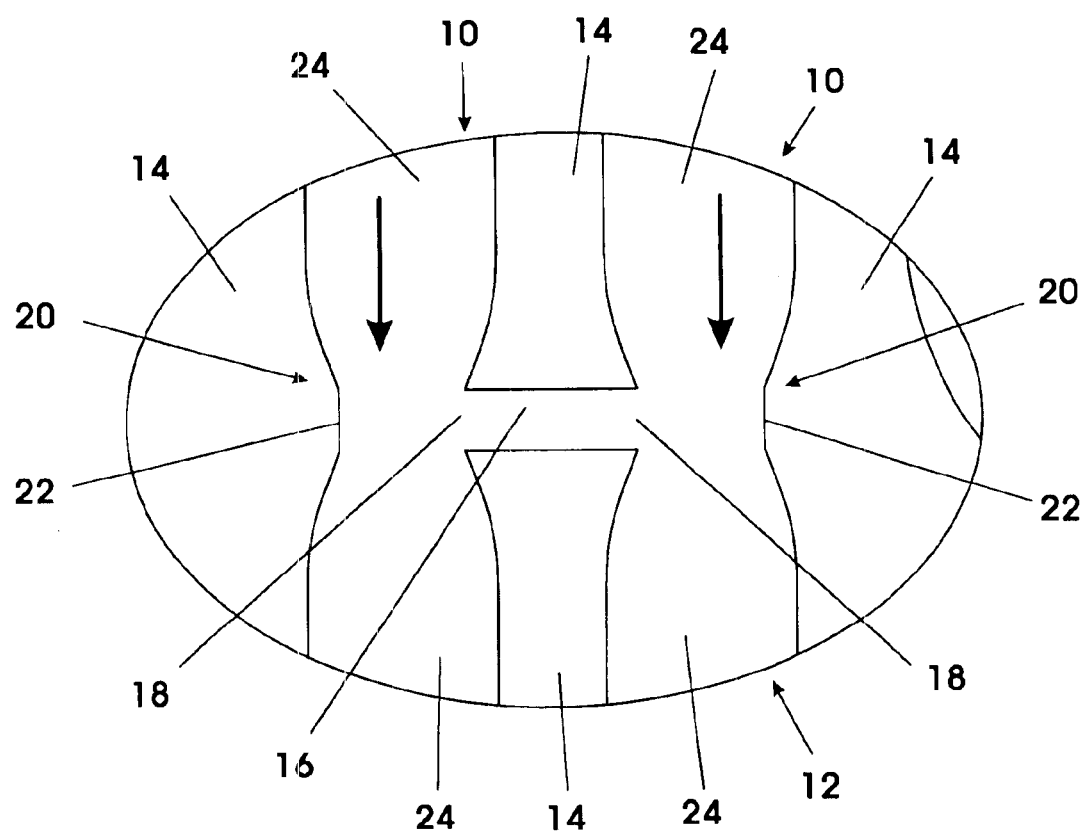
FIG. 1 is a schematic representation of an isolated view of two flowfield channel regions having an exemplary duct/venturis combination embodiment of the present invention.

FIG. 1 shows short sections of two parallel flowfield channels 10 with a duct/venturis combination 12. The channels 10 are longitudinally-extending concavities on the surface of a flowfield plate, bounded by lands 14. The channels 10 are connected one to the other via a duct 16. The duct 16 is a concavity having a duct end opening 18 at each end. Each channel 10 has a venturi 20, being an in-line tapered constriction of the channel 10. Each duct end opening 18 is located at the throat 22, or narrowest portion, of an associated venturi 18.

In use, the lands 14 abut an electrode plate (not shown) so as to substantially seal the channels 10, one from the other, except for the fluid interconnection provided by the duct 16. The cross-sectional area of the fluid passage formed by the duct 16 and electrode surface is less than the cross-sectional area of the fluid passage formed by each channel 10 and electrode surface at either the full-size channel segments 24 or the venturi 20. Suitable relative cross-sectional areas for the channels 10, venturi 20 and duct 16, depend on a variety of factors, including the general pattern of the flowfield, the length of the duct 16, the operating flow rate etc., and are best determined empirically on a case-by-case basis.

As shown in FIG. 1, in use, with neither channel 10 obstructed, reactant gas flows through both channels 10 at roughly equal flow velocities, as indicated by the bold arrows within the channels 10 in FIG. 1, and there is little or no pressure differential between the duct end openings 18 and thus little or no flow between the two channels 10 via the duct 16.

Figure 2:
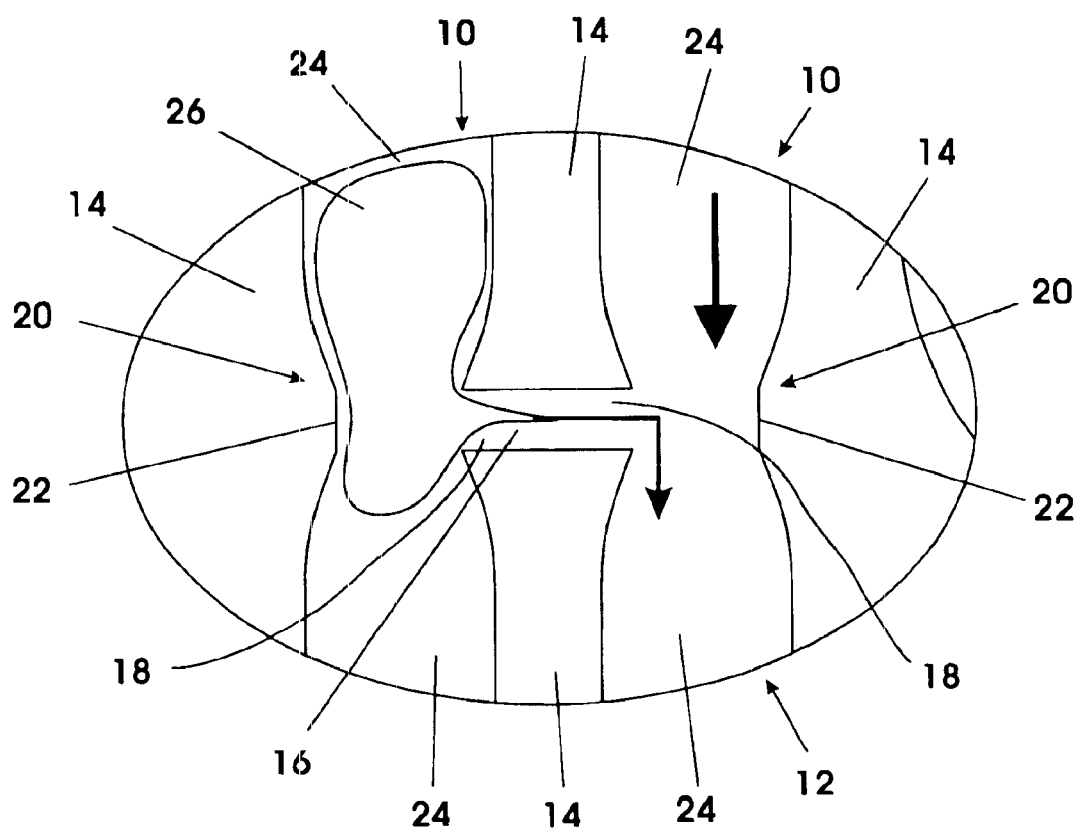
FIG. 2 is a schematic representation of an isolated view of the embodiment of FIG. 1 shown with water accumulation in a channel.

As shown in FIG. 2, when one or the other channel 10 is obstructed by a water accumulation 26, the flow velocity in the vicinity of the duct end opening 18 in the channel 10 that is obstructed is less than the flow velocity in the vicinity of the duct end opening 18 in the channel 10 that is unobstructed. The flow velocity differential as between the two duct end openings 18 is amplified by the venturis 20. This flow velocity differential may also be augmented by a diversion, at the channel inlets (not shown in FIGS. 1 and 2), of the flow of the reactant gas from the channel 10 that is obstructed (the channel on the left in FIG. 2) to the channel 10 that is unobstructed (the channel on the right in FIG. 2), depending on how the channel inlets and reactant gas feed means are configured. The flow velocity differential results in a pressure differential as between the vicinities of the duct end openings 18 that operates to draw water via the duct 16 from the channel 10 containing the water accumulation to the channel 10 that is not obstructed. In this way, the water accumulation 26 may be removed by diversion of the liquid water into the right-hand channel 10 and its expulsion from that channel, and the desired flow of reactant restored to the channel 10 that is obstructed.

Figure 3:
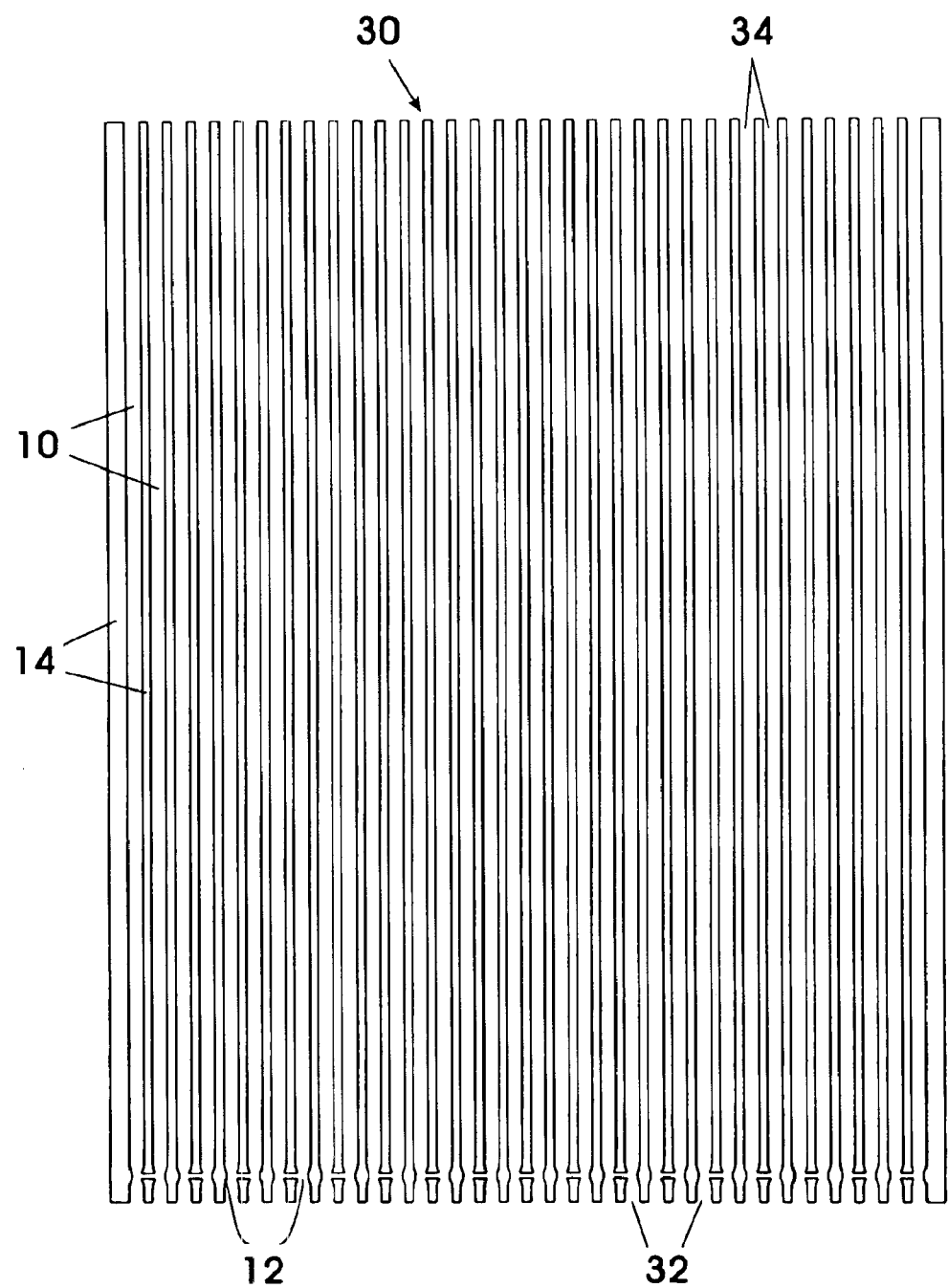
FIG. 3 is a schematic representation of a multiple-parallel-channel flowfield with each pair of channels having the duct and venturi embodiment of FIG. 1 located proximate to the channel outlets.

The duct/venturis combination 12 may be used in a variety of different flowfields. For example, as shown in FIG. 3, duct/venturis combinations 12 may be used in a multiple-parallel-channel flowfield 30. As shown in FIG. 3, the duct/venturis combinations 12 may be located proximate the channel outlets 32.

Figure 4:
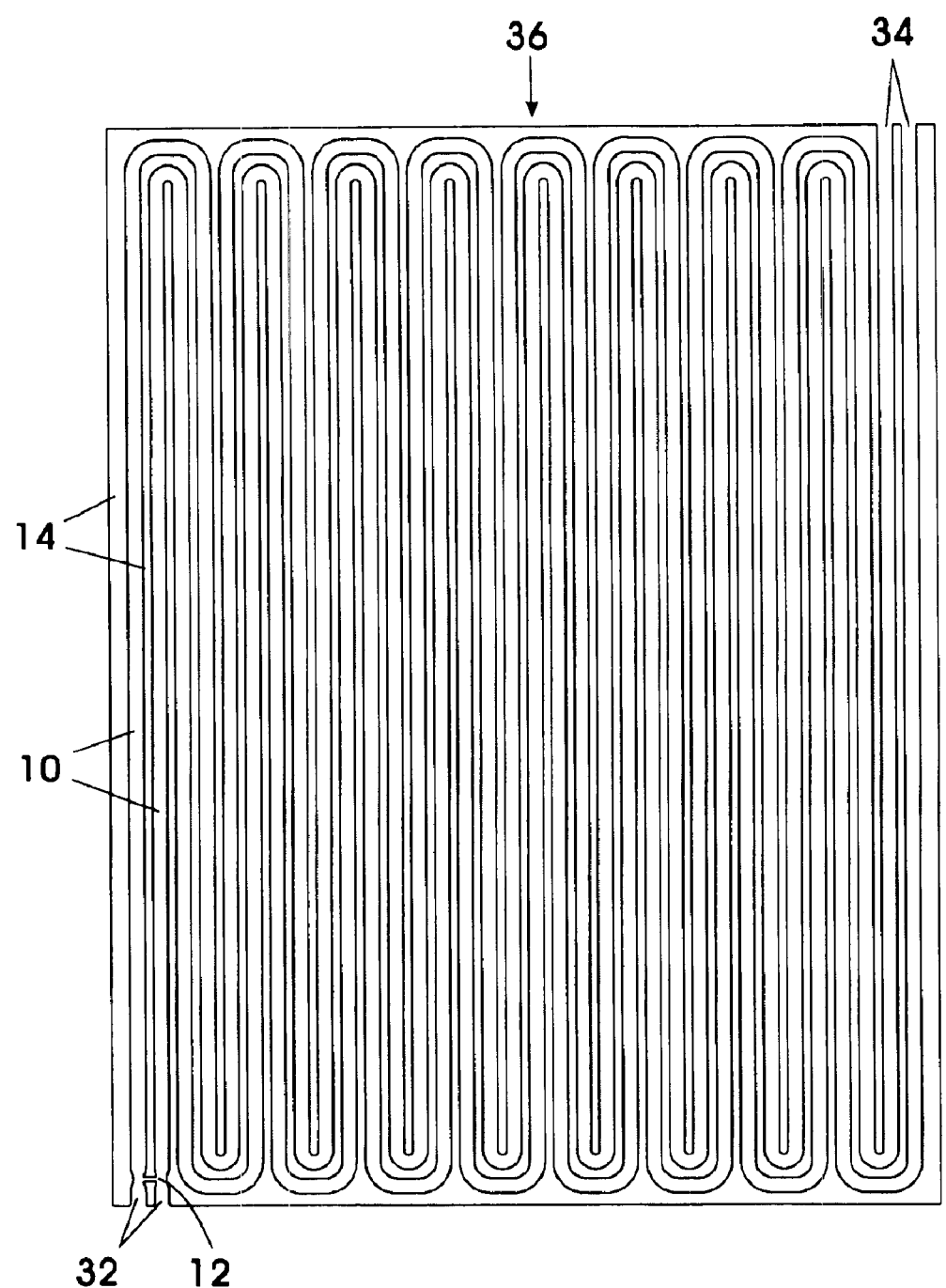
FIG. 4 is a schematic representation of a double-channel serpentine flowfield having the duct and venturi embodiment of FIG. 1 located proximate to the channel outlets.
Figure 5:
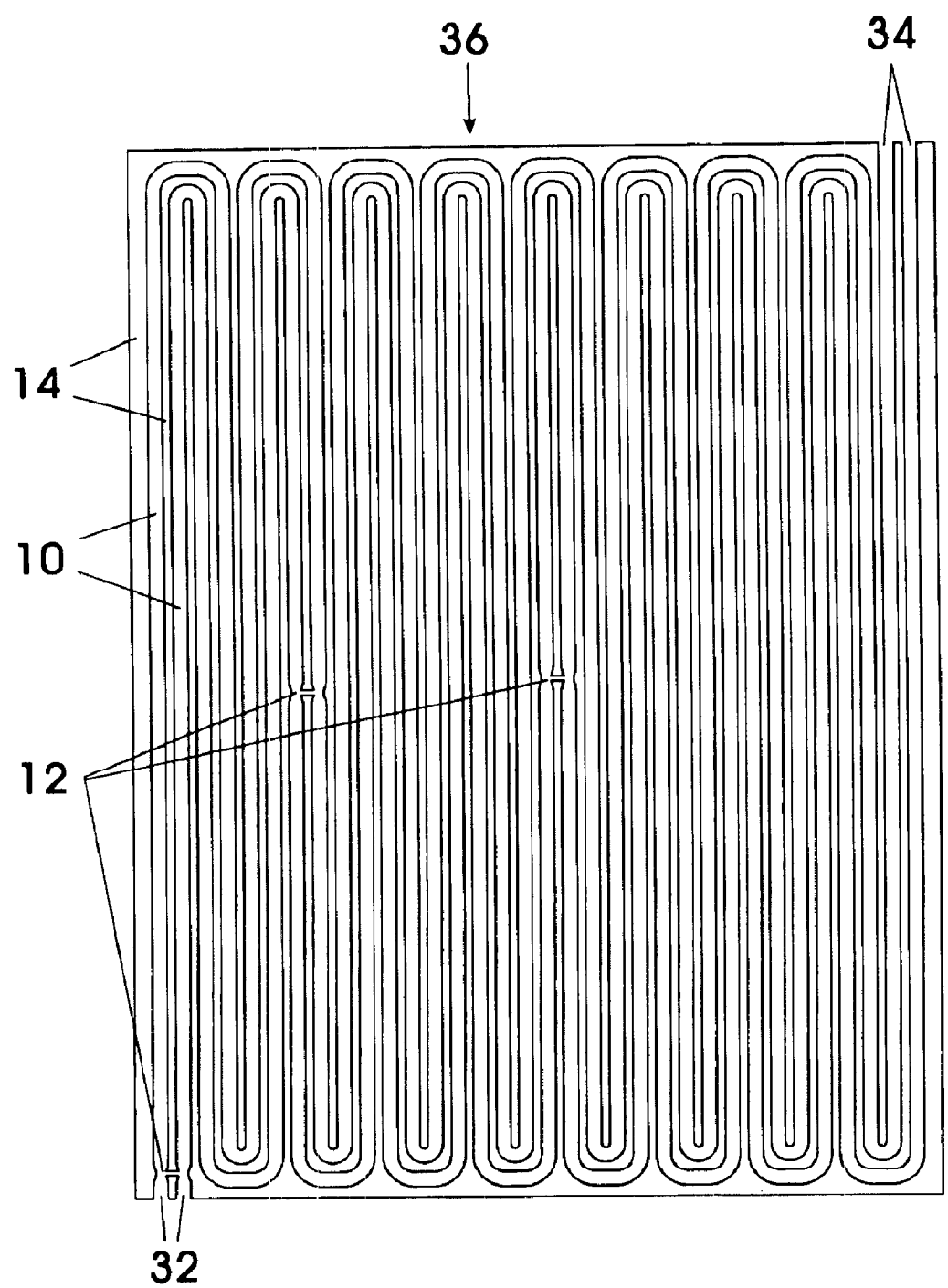
FIG. 5 is a schematic representation of a double-channel serpentine flowfield having the duct and venturi embodiment of FIG. 1 located proximate to the channel outlets, and at intermediate positions between the inlets and outlets of the channels.

FIG. 4 shows another exemplary use of a duct/venturis combination 12 in a double-channel serpentine flowfield 36. As shown in FIG. 5 with respect to an exemplary double-channel serpentine flowfield 36, each pair of channels 10 in a flowfield may share more than one duct/venturis combination 12.

Numerous modifications, variations and adaptations may be made to the particular embodiment of the invention described above without departing from the scope of the invention, which is defined in the claims.

What is claimed is:

1. A fuel-cell flowfield plate for use abutting an electrode plate in a fuel cell and in operation conducting reactant to an electrode plate and conducting liquid reaction product from the electrode plate, including first and second reactant channels on the surface thereof, through which channels the reactant flows when the plate is in use, each said channel having an inlet and an outlet; and lands that bound and separate the channels and that in use abut the electrode plate;

characterized in that:

the plate has a duct interconnecting the first and second channels, the duct having two duct end openings, a first duct end opening located at a position along the length of the first channel between the first-channel inlet and outlet, and a second duct end opening located at a position along the length of the second channel between the second-channel inlet and outlet, whereby the duct provides a fluid passage between the first and second channels, and wherein, in the event of whole or partial blockage of either of said channels by liquid reaction product, a consequent channel-flow velocity differential between the first channel in the vicinity of the first duct end opening and the second channel in the vicinity of the second duct end opening tends to promote fluid flow via the duct from the channel having the lower channel-flow velocity to the channel having the higher channel-flow velocity, thereby tending to eliminate or reduce the blockage.

2. The flowfield plate of claim 1, wherein the duct interconnects the first and second channels in the vicinity of their outlets.

3. The flowfield plate of claim 2, further comprising one or more additional ducts upstream of the first-mentioned duct, each said additional duct having two duct end openings one located at a selected position along the length of the first channel between the first-channel inlet and outlet and the other located at a corresponding position along the length of the second channel between the second-channel inlet and outlet, each said selected position being spaced from every other said selected position so as to provide a spaced sequence of ducts along the channels.

4. The flowfield plate of claim 1, wherein the first and second channels are of substantially the same length and of substantially the same cross-section throughout most of their length.

5. The flowfield plate of claim 1, wherein the minimum cross-section of the duct is less than the minimum cross-sections of the channels in the vicinity of the duct.

6. The flowfield plate of claim 1, further comprising a venturi associated with each duct end opening, located in-line in the respective channel, for, in use, increasing channel-flow velocity across the duct end opening.

7. The flowfield plate of claim 6, wherein each duct end opening is located in the vicinity of the narrowest portion of the associated venturi.

8. A fuel-cell flowfield plate for use abutting an electrode plate in a fuel cell and in operation conducting reactant to an electrode plate and conducting liquid reaction product from the electrode plate, including pairs of neighboring first and second reactant channels on the surface thereof, through which channels the reactant flows when the plate is in use, each said channel having an inlet and an outlet; and lands that bound and separate the channels and that in use abut the electrode plate;

characterized in that for each channel pair:

the plate has a duct interconnecting the first and second channels thereof, the duct having two duct end openings, one duct end opening located at a position along the length of the first channel between the first-channel inlet and outlet, and the other duct end opening located at a position along the length of the second channel between the second-channel inlet and outlet, whereby the duct provides a fluid passage between the first and second channels, and wherein, in the event of whole or partial blockage of either of said channels by reaction product, a consequent channel-flow velocity differential between the region upstream of the blockage and the other channel in the vicinity of the respective duct end opening tends to promote fluid flow via the duct from the blocked channel having the lower channel-flow velocity to the unblocked channel having the higher channel-flow velocity, thereby tending to eliminate or reduce the blockage.

9. The flowfield plate of claim 8, wherein the minimum cross-section of the duct is less than the minimum cross-sections of the channels in the vicinity of the duct.

10. The flowfield plate of claim 8, further comprising a venturi associated with each duct end opening, located in-line in the respective channel, for, in use, increasing channel-flow velocity across the duct end opening.

11. The flowfield plate of claim 10, wherein each duct end opening is located in the vicinity of the narrowest portion of an associated venturi.

12. A fuel-cell flowfield plate for conducting reactant to an electrode plate and conducting reaction-product from the electrode plate, the flowfield plate comprising:

a) at least two reactant channels on the surface of the flowfield plate, a first channel and a second channel, through which a reactant flows when in use, each channel having an inlet and an outlet;

b) lands that bound the channels and that in use abut an electrode plate;

c) a duct having two duct end openings, a first duct end opening located at a position along the length of the first channel between the first-channel inlet and outlet, and a second duct end opening located at a position along the length of the second channel between the second-channel inlet and outlet, whereby the duct provides a fluid passage between the first and second channels; and d) a venturi associated with each duct end opening, located in-line in the respective channel, for, in use, increasing channel-flow velocity across the duct end opening;

and wherein, in use, in the event of whole or partial blockage of either of said channels by liquid reaction product, a consequent channel-flow velocity differential between the first channel in the vicinity of the first duct end opening and the second channel in the vicinity of the second duct end opening tends to promote fluid flow via the duct from the channel having the lower channel-flow velocity to the channel having the higher channel-flow velocity, thereby tending to eliminate or reduce the blockage.

13. The flowfield plate of claim 12, wherein the minimum cross-section of the duct is less than the minimum cross-sections of the channels in the vicinity of the duct.

14. The flowfield plate of claim 12, wherein each duct end opening is located in the vicinity of the narrowest portion of an associated venturi.

* * * * *